US011164268B2

(12) United States Patent
Prezet et al.

(10) Patent No.: US 11,164,268 B2
(45) Date of Patent: Nov. 2, 2021

(54) SYSTEM, METHOD AND APPARATUS FOR RESPONDING DIFFERENTIALLY TO DATA REQUESTS

(71) Applicant: AMADEUS S.A.S., Biot (FR)

(72) Inventors: Hervé Prezet, Biot (FR); Michael Dominique Raymond Galopo, Biot (FR); Corinne Francoise Pascale Landra, Biot (FR); Thomas Brechet, Biot (FR)

(73) Assignee: AMADEUS S.A.S., Biot (FR)

( * ) Notice: Subject to any disclaimer, the term of this patent is extended or adjusted under 35 U.S.C. 154(b) by 45 days.

(21) Appl. No.: 16/511,038

(22) Filed: Jul. 15, 2019

(65) Prior Publication Data

US 2021/0019844 A1 Jan. 21, 2021

(51) Int. Cl.

*G06Q 30/00* (2012.01)
*G06Q 50/14* (2012.01)
*H04L 29/08* (2006.01)
*G06Q 30/02* (2012.01)

(52) U.S. Cl.

CPC ......... *G06Q 50/14* (2013.01); *G06Q 30/0207* (2013.01); *H04L 67/02* (2013.01); *H04L 67/1014* (2013.01); *H04L 67/306* (2013.01)

(58) Field of Classification Search

CPC .... G06Q 50/14; G06Q 30/0207; H04L 61/02; H04L 61/1014; H04L 61/306

See application file for complete search history.

(56) References Cited

U.S. PATENT DOCUMENTS

2005/0015466 A1 1/2005 Tripp
2018/0032513 A1 2/2018 Venkataraman et al.
2018/0204294 A1* 7/2018 Anzalota ............ G06Q 30/0255
2020/0151799 A1* 5/2020 O'Neil-Dunne ....... G06Q 50/14

* cited by examiner

*Primary Examiner* — Alvin L Brown

(74) *Attorney, Agent, or Firm* — Perry + Currier

(57) ABSTRACT

To differentially respond to data requests, a request handling server stores (i) a predefined set of response definitions, each response definition having a distinct assigned virtual requester identifier, and (ii) for each virtual requester identifier, a selection criterion. The server receives a data request associated with one of a plurality of requesters, and includes (i) request parameters and (ii) a requester attribute set. The data request may be a request for travel product offers formatted according to the New Distribution Capability (NDC) standard. The server compares the requester attribute set with the selection criteria; based on the comparison, assigns a selected one of the virtual requester identifiers to the data request; retrieves an active one of the response definitions corresponding to the selected virtual requester identifier; obtains response data according to the request parameters and the active response definition; and transmits, in response to the data request, the response data.

22 Claims, 7 Drawing Sheets

SYSTEM, METHOD AND APPARATUS FOR RESPONDING DIFFERENTIALLY TO DATA REQUESTS

FIELD

The specification relates generally to data request handling, and specifically to a system, method and apparatus for responding differentially to data requests according to the origins of the requests.

BACKGROUND

In a variety of contexts, a computing device (e.g. a server) receives requests for data and generates responses to those requests (i.e. generates and/or retrieves the data for return to the requester). In some scenarios, the content of the response varies based on characteristics of the requester. For example, in the travel industry, a travel agent entity may submit a request for travel product offers (e.g. flights) to a computing device or network of devices implementing airline offer construction logic. Such a system may then, in order to generate a response to the request, process a set of rules defining response content (e.g. scheduling and fare information for the above-mentioned flights) specific to each of a number of individual travel agent entities.

The above approach, however, requires that rules specific to each requesting entity be deployed at the request handler (e.g. a global distribution system (GDS). Increasing numbers of requesters increases the computational cost and complexity of implementing such rules. Further, some systems employ an intermediate entity between requesters and request handlers, such as an aggregator system connecting a requester to multiple request handlers. The presence of such intermediate entities further complicates the accurate identification of requesters at the request handlers.

SUMMARY

An aspect of the specification provides a method of differential responses to data requests in a request handling server, the method comprising: storing, in a memory of the request handling server: (i) a predefined set of response definitions, each response definition having a distinct assigned virtual requester identifier; and (ii) for each virtual requester identifier, a selection criterion; receiving a data request associated with one of a plurality of requesters, the data request including (i) request parameters and (ii) a requester attribute set; comparing the requester attribute set with the selection criteria; based on the comparison, assigning a selected one of the virtual requester identifiers to the data request; retrieving an active one of the response definitions corresponding to the selected virtual requester identifier; obtaining response data according to the request parameters and the active response definition; and transmitting, in response to the data request, the response data.

Another aspect of the specification provides a request handling server comprising: a memory storing: (i) a predefined set of response definitions, each response definition having a distinct assigned virtual requester identifier; and (ii) for each virtual requester identifier, a selection criterion; a communications interface; and a processor connected with the memory and the communications interface, the processor configured to: receive a data request associated with one of a plurality of requesters via the communications interface, the data request including (i) request parameters and (ii) a requester attribute set; compare the requester attribute set with the selection criteria; based on the comparison, assign a selected one of the virtual requester identifiers to the data request; retrieve an active one of the response definitions corresponding to the selected virtual requester identifier; obtain response data according to the request parameters and the active response definition; and transmit, in response to the data request, the response data via the communications interface.

BRIEF DESCRIPTIONS OF THE DRAWINGS

Embodiments are described with reference to the following figures, in which.

Figure 3:
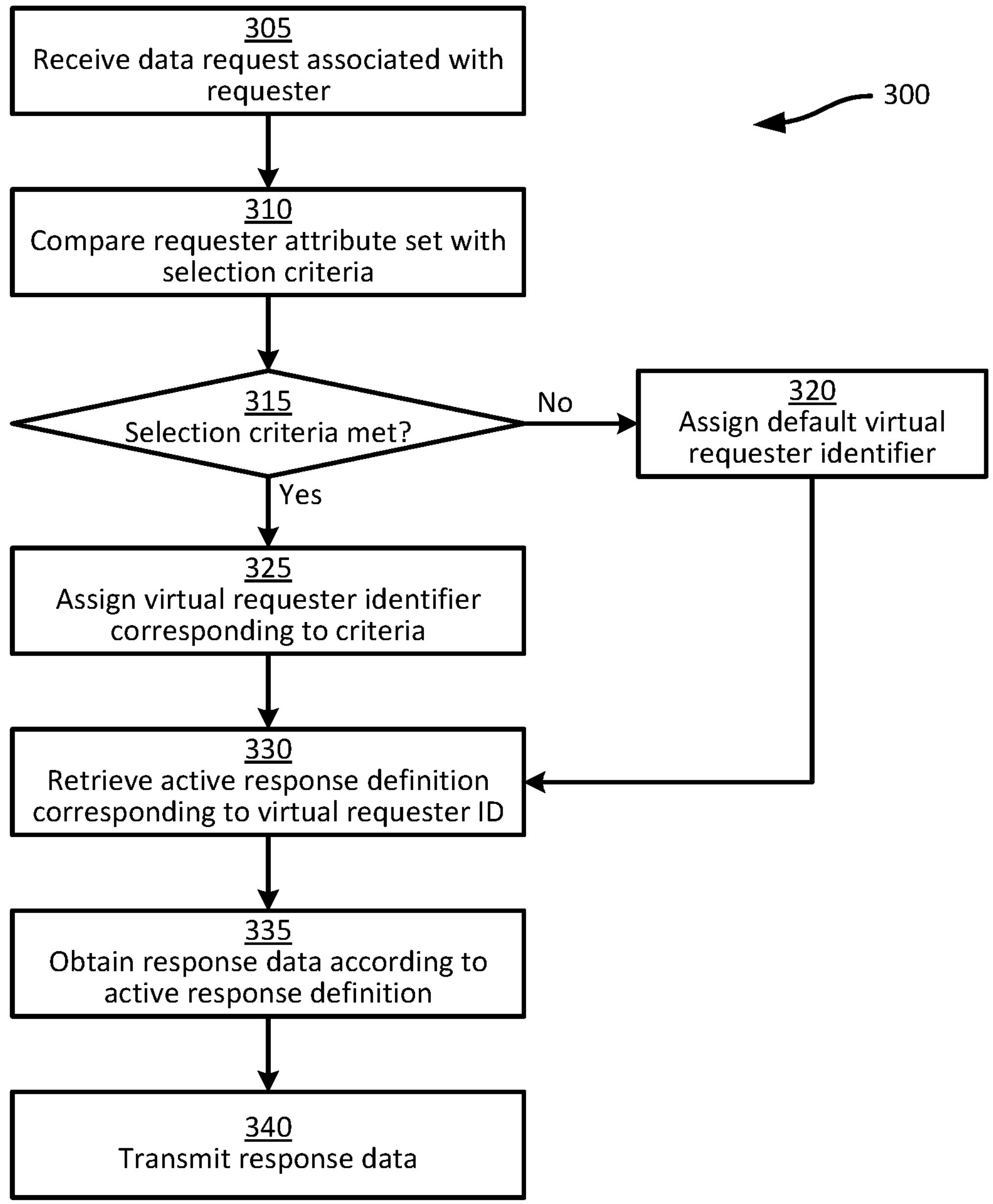
FIG. 3 depicts a method of responding differentially to data requests.
Figure 6:
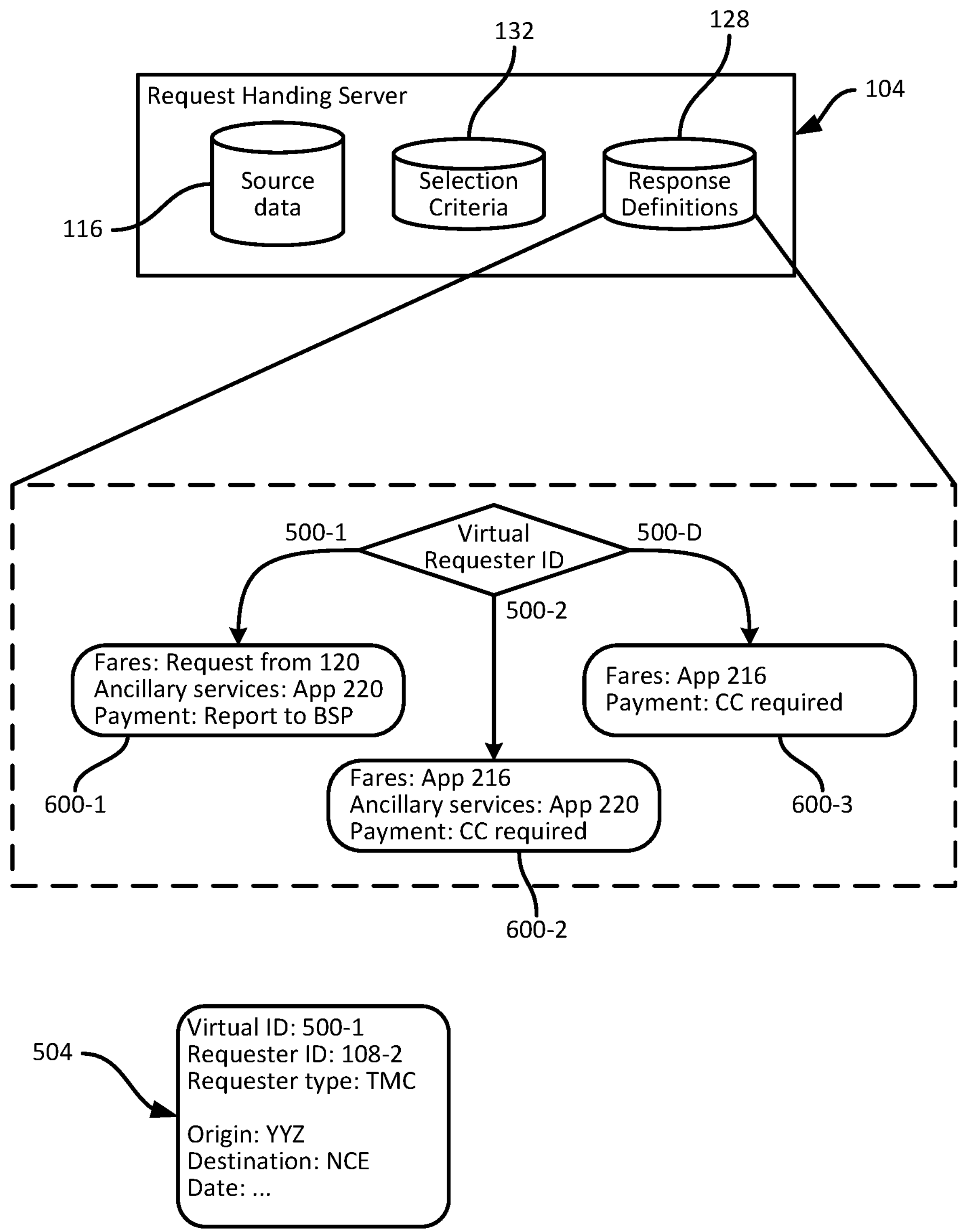
Figure 7:
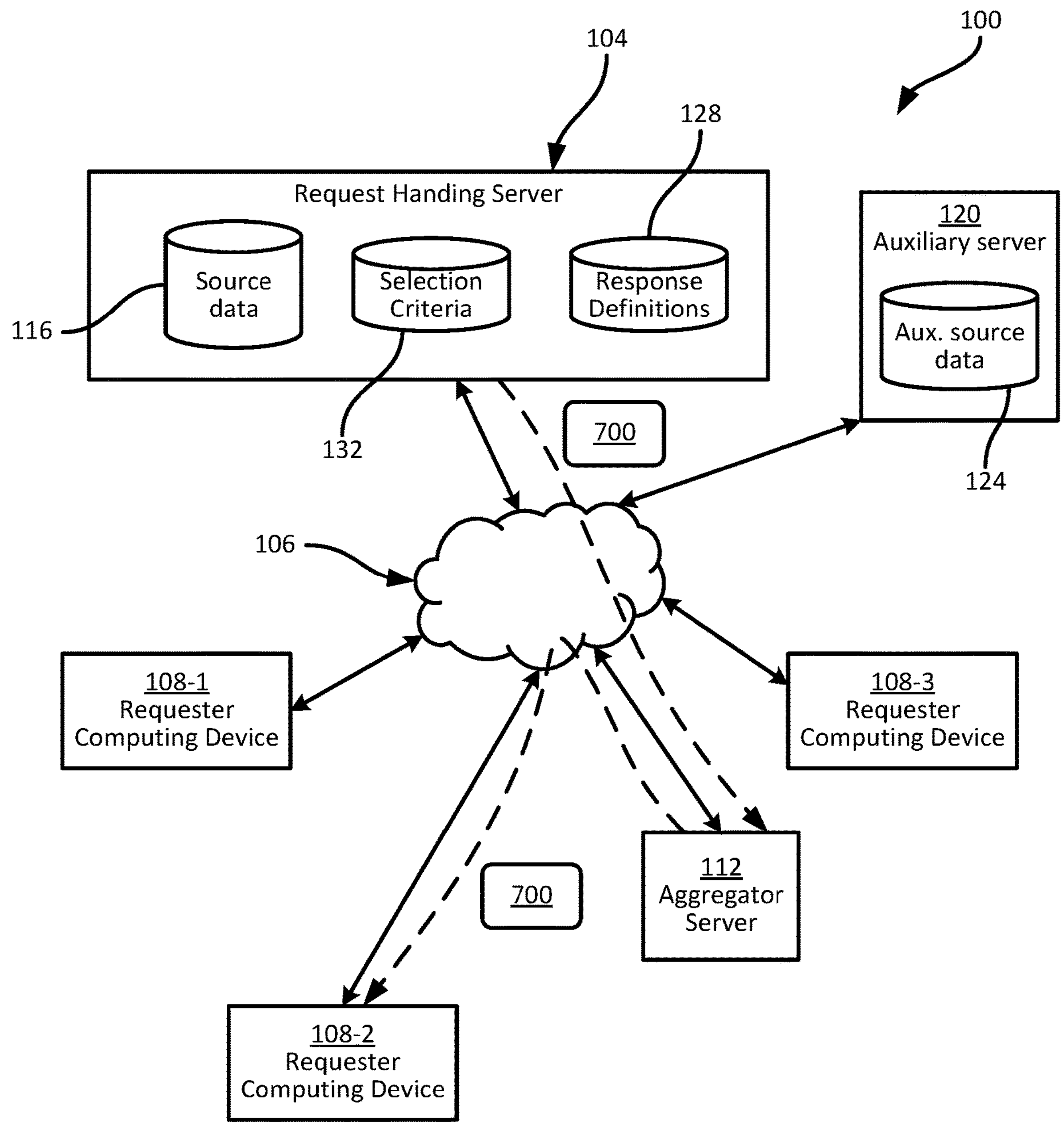

FIG. 6 depicts example response definitions employed at blocks 330 and 335 of the method of FIG. 3; and FIG. 7 depicts an example performance of block 340 of the method of FIG. 3.

DETAILED DESCRIPTION

Figure 1:
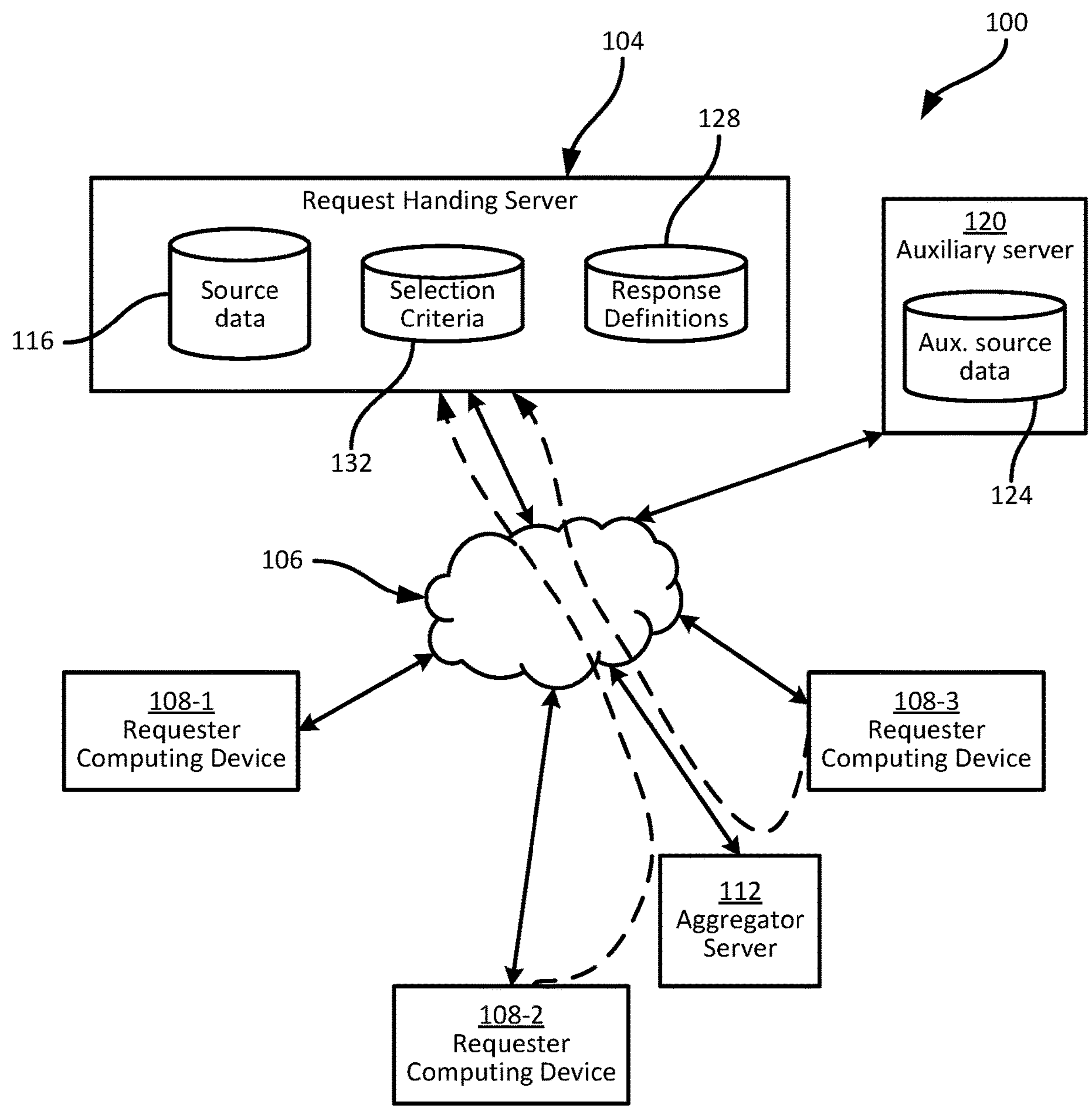
FIG. 1 depicts a system for responding differentially to data requests

FIG. 1 depicts a system 100 for responding differentially to data requests. The system 100 includes a request handling server 104 (also referred to simply as the server 104 herein) that receives data requests, via a network 106, associated with requester computing devices, of which examples 108-1, 108-2, and 108-3 are shown. It will be understood that greater or smaller numbers of requester computing devices 108 (also referred to simply as requesters 108 herein) can be provided in other embodiments. The data requests may be transmitted directly from a requester 108 to the server 104 via the network 106, as in the case of the requester 108-1. Other requesters, such as the requesters 108-2 and 108-3, may transmit data requests to an aggregator server 112 (also referred to simply as an aggregator 112), which relays the data requests to the server 104, as illustrated by the dashed lines in FIG. 1. In other words, some data requests, although associated with the requesters 108 that originated the data requests, are not received at the server 104 from the requesters 108 themselves.

The server 104 stores a source data repository 116 from which responses to the data requests are generated. The system 100 may also include one or more auxiliary servers employed in the generation of responses to the data requests. An example auxiliary server 120 is shown in FIG. 1, storing an auxiliary source data repository 124. The server 104 and/or the auxiliary server 120 can each generate a portion of the response to a data request, based on either or both of the contents in the repositories 116 and 124.

The generation of responses by the server 104 (with or without involvement of the auxiliary server 120) is referred to as differential because the responses generated by the server 104 depend both on request parameters in the data requests, and on attributes of the requester 108 itself. That is, if two different requesters 108 transmit data requests with the same request parameters, the responses provided to each requester are not necessarily the same. As will be described in greater detail below, the server 104 implements various functionality to enable such differential response generation while mitigating increases in storage requirements and computational complexity that would arise in previous systems enabling differential response generation.

The functionality of the system 100, and particularly of the server 104, will be described below in connection with an example deployment of the system 100 to respond to requests for travel products. As will be apparent to those skilled in the art, however, the system 100 may also be deployed in a variety of other contexts, making use of the functionality described herein to efficiently enable differential response generation.

More specifically, in the examples discussed below, the server 104 is operated by or on behalf of a supplier of travel products, such as flights and ancillary services. That is, the server 104 is operated by or on behalf of an airline. The source data 116 therefore includes data defining flight schedules, fares, available ancillary services (e.g. baggage check, seat selection, and the like). The auxiliary server 120 may also be operated by or on behalf of the airline, and in some examples may be integrated with the request handling server 104 (e.g. as an additional application executed by the server 104).

The requester computing devices 108 are computing devices, or sets of computing devices (e.g. joined by internal networks or the like), operated by entities that advertise and/or sell the above-mentioned travel products to customers (e.g. individuals seeking flights). That is, the entities operating the requesters 108 are intermediaries between the airline and the customers. The requesters 108, in response to queries from the above-mentioned customers, send data requests to the server 104. The data requests may also be referred to as offer requests or shopping requests, and typically specify certain request parameters, such as origin and destination locations for a flight, departure (and, if applicable, return) dates, and the like. The server 104 generates responses including one or more offers (e.g. flights and/or ancillary servers) that satisfy the request parameters as well as any additional requester-specific conditions defined at the server 104.

The operators of the requester devices 108 are typically referred to as travel agents, and may be categorized in various manners according to their relationships to customers and airlines. For example, the requester 108-1 may be referred to as a metasearch travel agent. The requester 108-1 can be configured to request offers on behalf of customers (e.g. who may interact with the requester 108-1 via web browsers), and to present the offers received from the server 104 to customers. The requester 108-1, however, does not typically complete bookings, instead redirecting the customer to a website operated by the airline for booking.

The requester 108-2 may be, for example, a travel management company (TMC), managing the provision of travel products on behalf of one or more organizations. In other words, the requester 108-2 is a corporate or organizational travel agent. The requester 108-3 may be, for example, an online travel agency (OTA) accessed by customers via the Internet to requests offers of travel products from the server 104, and to purchase such travel products.

The aggregator 112, as illustrated in FIG. 1, can intermediate between certain requesters 108 (e.g. the requesters 108-2 and 108-3) and the server 104. Although not shown in FIG. 1 for simplicity of illustration, the aggregator 112 typically connects to multiple servers 104 (e.g. operated by different airlines or other suppliers). Thus, the aggregator 112 may receive a request from a requester 108, and generate multiple requests to each of a plurality of distinct servers 104. The aggregator 112 may then, upon receipt of the responses from each server 104, return the collected responses to the relevant requester 108.

As will now be apparent to those skilled in the art, the generation of responses to data requests is performed by the same entity (the airline in the illustrated example) that supplies the products defined in the responses. The responding entity is, therefore, the master source of the response data. This arrangement contrasts with previous systems, in which responses are generated by intermediate entities. For example, in some previous systems, a plurality of Global Distribution Systems (GDSs), e.g. each implemented by servers or more typically a network of servers, receive data requests from the requesters 108. Each GDS also obtains, either directly from suppliers (e.g. airlines) or more typically from third party publishers, fare and scheduling information (i.e. at least a portion of the source data in the repositories 116 and 124). Such information defines rules specifying which requesters 108 have access to which flights and/or fares. For example, certain requesters 108 may have negotiated pricing agreements with one or more suppliers. Such agreements may grant the requester access to discounted pricing.

Each GDS typically assigns authentication and/or connection credentials to each requester 108 that the GDS serves. Upon receiving a request from a requester 108, a given GDS processes the above-mentioned rules according to the identity of the requester 108 to generate a response. The GDS therefore also responds differentially to data requests from the requesters 108 that it serves. That is, two requesters 108 requesting flights on the same dates between the same endpoints may receive different offers based on the above agreements, as implemented at the GDS server via the fare and scheduling data.

As noted above, in the system 100 the server 104 does not merely provide fare and scheduling information to a set of GDSs or third-party publishers. Instead, the server 104, for example as contemplated by the New Distribution Capability (NDC) standard, is directly responsible for receiving data requests and generating responses to the requests. Shifting responsibility for response generation to the supplier (i.e. the operator of the server 104), as contemplated by the NDC standard, introduces certain technical challenges for the server 104 that the prior GDS-based model does not address adequately.

The server 104, as the host of the source data 116 (and by association, the source data 124), must respond to requests from all requesters 108, whereas any individual GDS in prior systems responds only to requests from a subset of requesters 108. In other words, the number of requesters 108 for which the server 104 must generate responses to data requests may be significantly larger than the number of requesters 108 that any individual GDS interacts with. Maintaining separate credentials for each requester 108 and/or sets of response generation rules for each requester 108 may be prohibitively costly in terms of storage requirements and computational load at the server 104, in addition to being time-consuming and costly to deploy. The above challenges can increase significantly in scale for systems in which the same computing infrastructure_ serves multiple airlines or other travel product suppliers (e.g. the infrastructure may be operated by an information technology provider on behalf of numerous airlines). In other words, the same underlying infrastructure may implement a plurality of distinct servers 104, each required to support a large number of distinct requester credentials. For a given set of airlines, each interacting with a substantial number of requesters, the required number of credentials may become prohibitively costly to manage by the underlying infrastructure.

In addition, even if GDS-like rules specific to each requester 108 were to be implemented at the server 104, requesters 108 that submit requests to the aggregator 112 would nevertheless present a further challenge to the server 104. The rules at the server 104 may correspond to the aggregator 112, preventing the server 104 from differentially responding to requests from the requesters 108-2 and 108-3. Alternatively, rules specific to the requesters 108-2 and 108-3 may be implemented at the server 104, but the aggregator 112 may be required to employ a plurality of separate identifiers and/or connection credentials to communicate with the server 104 on behalf of different requesters 108.

Beyond the technical challenges discussed above, deploying rules to differentiate responses to requests for product suppliers can itself be a time-consuming and therefore costly task. The airline or other supplying entity responsible for provisioning such rules may be required to manage a substantial number of rules (e.g. depending on the number of requesters 108). In previous systems, introducing additional rules may have a cascading effect on existing rules, requiring the supplying entity to reconfigure a substantial portion of the rules to implement additional product distribution logic, rather than simply retaining existing logic while deploying the additional logic.

Therefore, as will be discussed in greater detail below, the server 104 implements response generation in a manner that retains at least some ability to differentiate between requesters 108, without the technical burden of provisioning connection credentials and/or response generation rules for each and every requester 108.

To that end, the server 104 maintains, in addition to the source data 116, a set of response definitions 128. Each response definition in the set of definitions 128 defines various configuration parameters for use in generating a response to an incoming request from (or associated with) a requester 108. Each response definition has a distinct virtual requester identifier. In addition, the server 104 maintains selection criteria 132, employed to assign one of the above-mentioned virtual requester identifiers to an incoming request. That is, upon receiving a data request, the server 104 employs the selection criteria 132 to assign a virtual requester identifier to the request, and retrieves the corresponding response definition for use in generating the response. By decoupling the response definitions 128 from individual requesters 108, the server 104 may therefore implement a smaller number of response definitions than there are requesters 108. However, as will be discussed below, the server 104 may nevertheless implement requester-specific logic during response generation.

Figure 2:
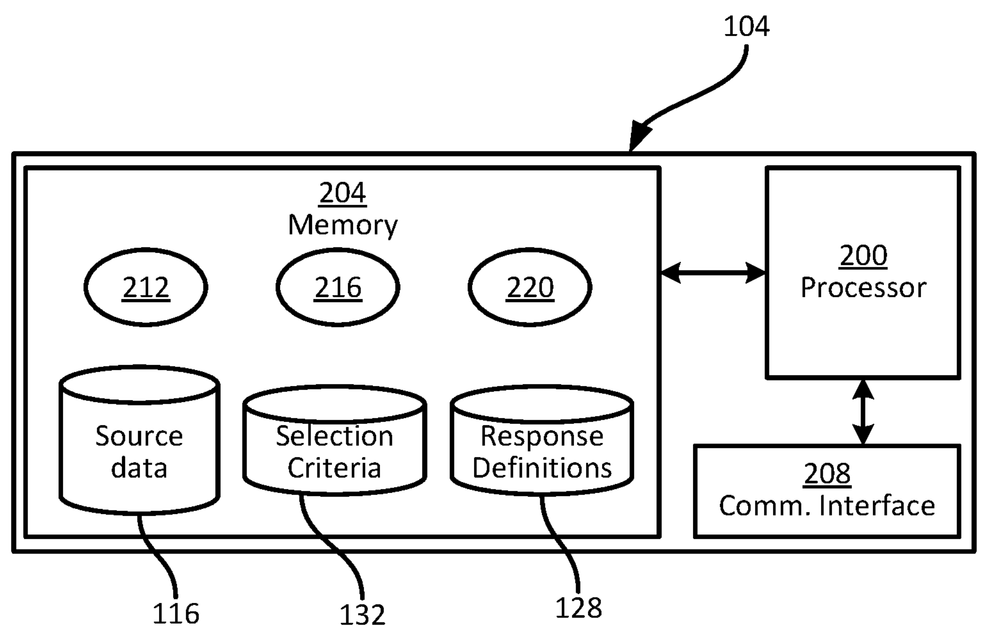
FIG. 2 depicts certain components of the request handling server of FIG. 1.

Turning to FIG. 2, before discussing the functionality of the system 100 in greater detail, certain components of the server 104 will be discussed in greater detail. As shown in FIG. 2, the server 104 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the server 104 to communicate with the other computing devices of the system 100 (i.e. the aggregator 112, auxiliary server 120 and requesters such as the requester 108-1). supplier subsystem 104 and the client subsystem 120) via the network 106. The communication interface 208 therefore includes any necessary components (e.g. network interface controllers (NICs), radio units, and the like) to communicate via the network 106. The specific components of the communication interface 208 are selected based on the nature of the network 106. The server 104 can also include input and output devices connected to the processor 200, such as keyboards, mice, displays, and the like (not shown).

The components of the server 104 mentioned above can be deployed in a single enclosure, or in a distributed format. In some examples, therefore, the server 104 includes a plurality of processors, either sharing the memory 204 and communication interface 208, or each having distinct associated memories and communication interfaces.

The memory 204 stores the source data 116, the response definitions 128 and the selection criteria 132 mentioned above in connection with FIG. 1. The memory 204 also stores a plurality of computer-readable programming instructions, executable by the processor 200, in the form of various applications, including a differential response generation application 212 (also referred to herein simply as the application 212). As will be understood by those skilled in the art, the processor 200 executes the instructions of the application 212 (and any other suitable applications) in order to perform various actions defined by the instructions contained therein. In the description below, the processor 200, and more generally the server 104, are said to be configured to perform those actions. It will be understood that they are so configured via the execution (by the processor 200) of the instructions of the applications stored in memory 204.

Execution of the application 212, as will be discussed below, configures the server 104 to receive a data request, such as a request for travel product offers as noted above. Execution of the application 212 further configures the server 104 to compare a requester attribute set of the request to the selection criteria 132, and based on the comparison, to assign one of the virtual requester identifiers to the request. Further, the server 104 is configured via execution of the application 212 to retrieve an active response definition from the response definition set 128, and to generate a response to the request according to the active response definition. The response definitions may themselves require the execution of additional applications, such as example response component generator applications 216 and 220 shown in FIG. 2. The applications 216 and 220 may be responsible for a wide variety of response generation actions, such as ancillary service selection, pricing selection, and the like. Such applications may also reside outside the server 104, for example at the auxiliary server 120.

Turning now to FIG. 3, certain aspects of the operation of the system 100 will be described in greater detail. Specifically, FIG. 3 illustrates a method 300 of differentially responding to data requests. The method 300 will be described in conjunction with its performance within the system 100. In particular, the blocks of the method 300 are performed at the server 104 via the execution of the application 212 (and optionally the applications 216 and 220) by the processor 200.

Figure 4:
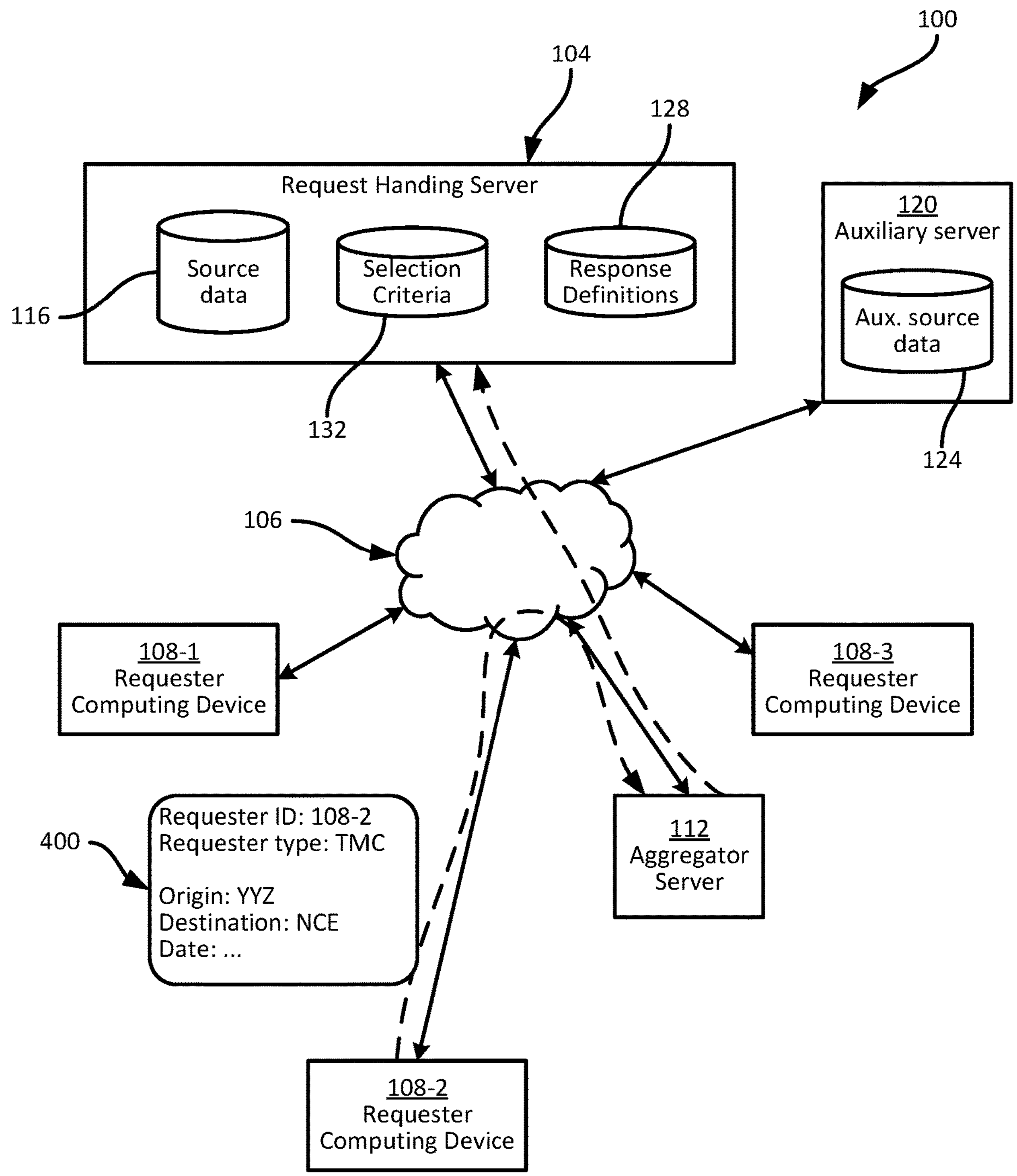
FIG. 4 depicts an example performance of block 305 of the method of FIG. 3.

At block 305, the server 104 receives a data request associated with a requester 108. Turning to FIG. 4, an example performance of block 305 is illustrated, in which a request 400 is transmitted from the requester 108-2, via the network 106, to the aggregator 112. The aggregator 112 then transmits the request to the server 104, and as noted above, may also transmit the request to a plurality of other servers 104 (e.g. operated by other airlines). The format of the request 400 is not particularly limited. For example, the aggregator 112 may implement any suitable format for receiving requests from its client requesters 108. In some examples, the server 104 is configured to receive requests formatted according to the NDC standard, and to generate responses also formatted according to the NDC standard. The aggregator 112 may therefore be configured to convert the request 400 into an NDC request before sending the request 400 to the server 104.

The request 400, as shown in FIG. 4, includes request parameters including, in the present example, origin and destination locations. The request parameters may also include dates of travel, an indication of whether direct or multi-leg trips are preferred, and the like. In other words, the request parameters defined desired characteristics of the response data (i.e. of the travel products sought by the request 400, in the present example). The request 400 also includes a requester attribute set. In contrast to the request parameters, the requester attribute set defines characteristics of the requester 108 that initiated the request. For example, as shown in FIG. 4, the requester attribute set of the request 400 includes a requester identifier (108-2) and a requester type, indicating that the requester 108-2 is a TMC. Various other requester attributes may also be included. For example, the requester attributes can include a market identifier, indicating a geographic region in which the requester 108-2 operates. Various other requester attributes will also be apparent to those skilled in the art.

In some examples, when the request 400 is routed to the server 104 via the aggregator 112, the request 400 may be modified at the aggregator 112. For example, the aggregator 112 can insert its own identifier in the request, such that the requester attribute set includes both the identifier of the requester 108-2 itself, and the identifier of the aggregator 112.

Returning to FIG. 3, at block 310 the server 104 compares the requester attribute set of the request received at block 305 (i.e. the request 400, in the example illustrated in FIG. 4) with the selection criteria 132. The selection criteria 132, in general, define one or more conditions for each virtual requester identifier employed by the server 104. When the requester attributes of the request satisfy the conditions corresponding to a virtual requester identifier, that virtual requester identifier is assigned to the request.

Figure 5:
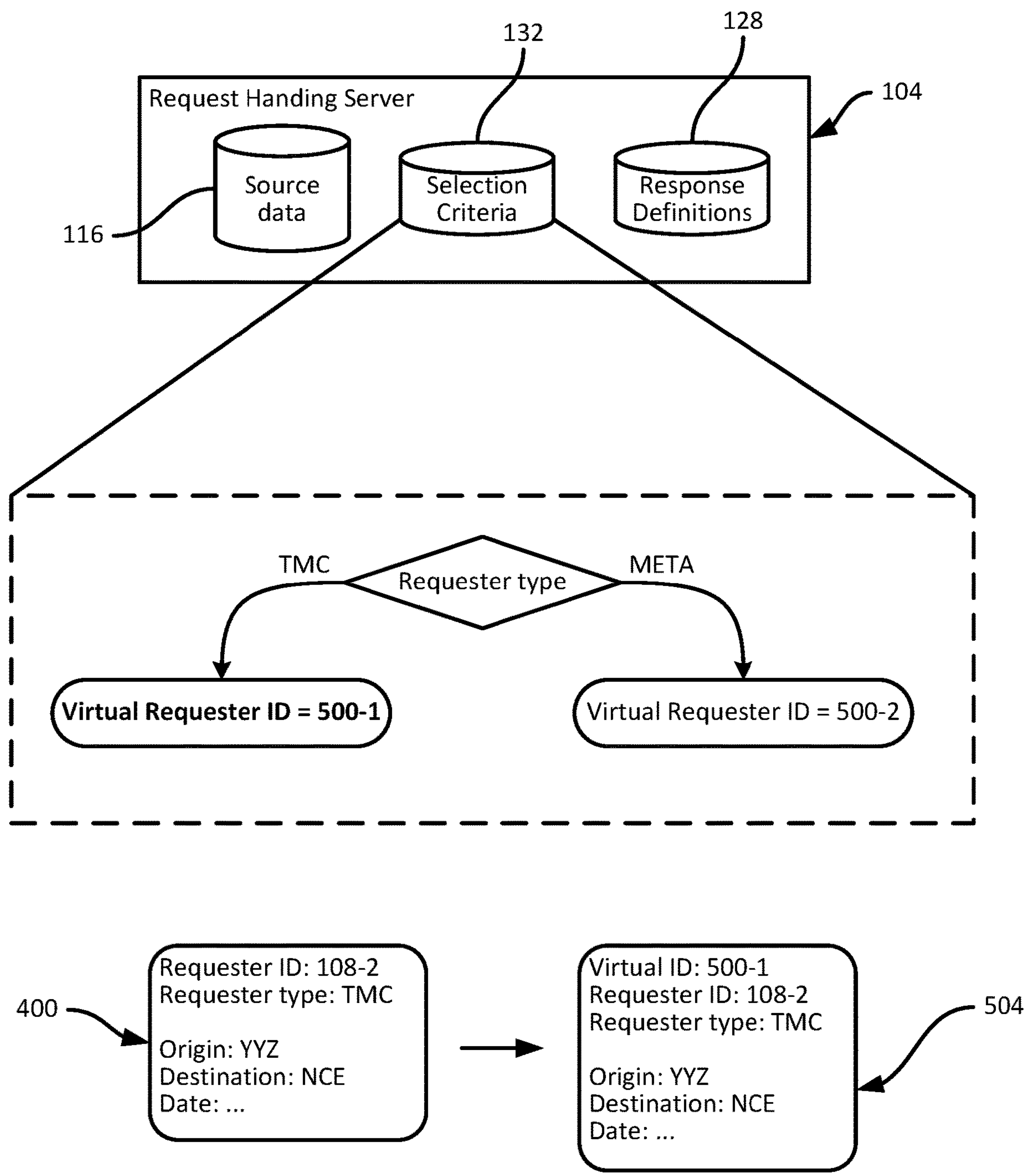
FIG. 5 depicts example selection criteria employed at blocks 310 and 315 of the method of FIG. 3.

Turning to FIG. 5, a schematic illustration of the selection criteria 132 is shown. Specifically, selection criteria are shown for two virtual requester identifiers 500-1 and 500-2. The selection criteria as illustrated in FIG. 5 assess only the requester type from the request 400. That is, when the requester type is "TMC", the virtual requester identifier 500-1 is assigned to the request. When the requester type is "META", on the other hand (e.g. for metasearch requesters, such as the requester 108-1 shown in FIG. 1), the virtual requester identifier 500-2 is assigned to the request. The virtual requester identifiers 500 can take a variety of forms. In the present example, the virtual requester identifiers are pseudo-city-codes (PCCs), which may also be referred to as OfficeIDs, employed by various travel product suppliers to identify entities such as travel agents.

At block 315, the server 104 determines whether any of the selection criteria 132 are met by the requester attribute set. When the determination is negative, a default virtual requester identifier (e.g. 500-D, which will be discussed in greater detail further below) is assigned to the request at block 320. However, when the determination at block 315 is affirmative, a virtual requester identifier corresponding to whichever selection criterion is satisfied is assigned to the request by the server 104 at block 325. Referring again to FIG. 5, in the present example performance of the method 300, the request 400 (a copy of which is shown in FIG. 5) contains the requester type "TMC", and the virtual requester identifier 500-1 is therefore assigned to the request 400 at block 325. The request 400 may be modified for internal use at the server 104 to include the assigned virtual requester identifier. For example, the server 104 may generate an updated request 504, as shown in FIG. 5, that includes the content of the original request 400, as well as the virtual requester identifier 500-1.

Following assignment of a virtual requester identifier to the request at block 325 (or assignment of the default virtual requester identifier at block 320), the server 104 proceeds to block 330. At block 330, the server 104 retrieves one of the response definitions from the set of response definitions 128. The response definition retrieved at block 330, referred to as the active response definition, corresponds to the virtual requester identifier assigned at block 320 or 325. That is, the server 104 maintains one response definition for each virtual requester identifier, and the virtual requester identifier assigned at block 320 or 325 dictates which response definition is retrieved at block 330.

Turning to FIG. 6, a schematic illustration of three example response definitions is shown. The three response definitions are a response definition 600-1 corresponding to the virtual requester identifier 500-1, a response definition 600-2 corresponding to the virtual requester identifier 500-2, and a response definition 600-3 corresponding to the default virtual requester identifier 500-D. Therefore, in the present example performance of block 330, the server 104 retrieves the response definition 600-1 from the set of response definitions 128.

Returning to FIG. 3, at block 335 the server 104 obtains response data for the request 400 (or, in the present example, the internal form 504 of the request 400), according to the active response definition. Referring again to FIG. 6, each response definition 600 specifies rules, configuration settings or other instructions for use in generating or otherwise obtaining response data. In the present example, each response definition includes configuration information for one or more of fare data generation, ancillary service selection, and payment information requirements. As will be apparent to those skilled in the art, the nature of the response definitions can vary widely depending on the nature of the data requests. As will also be understood, the response definitions need not only specify configuration settings and the like for response generation, but can also specify subsequent handling processes, e.g. when a travel product in the response data is selected for purchase by a requester 108. That is, assigning virtual requester identifiers and retrieving response definitions as described above can determine not only response data generation for the initial request, but also one or more processing steps for subsequent requests associated with the request from block 305.

As is apparent from FIG. 6, each response definition may cause the generation of certain portions of the response data according to a different mechanism. For example, the response definition 600-1 causes the server 104 to request fare information from the auxiliary server 120, where the repository 124 may specify discounted pricing for TMC requesters. The response definitions 600-2 and 600-3, on the other hand, cause the server 104 to generate or retrieve fare information via the execution of the application 216. As a further example, the response definition 600-1 imposes a different payment requirement than the response definitions 600-2 and 600-3. Specifically, the response definition 600-1 indicates that payment for a travel product selected for purchase by the relevant requester 108 (from the offered travel products in the response) is effected via reporting by the server 104 to a billing and settlement plan (BSP) server (not shown) that intermediates payments between travel agent entities and supplier entities (e.g. airlines). The response definitions 600-2 and 600-3, meanwhile, require payment by credit card at the time of purchase. Still further, the response definition 600-3 does not configure the server 104 to select ancillary services during response generation, whereas the response definitions 600-1 and 600-2 cause the selection of ancillary services via execution of the application 220.

In the present example performance of block 335, therefore, the server 104 transmits a request to the auxiliary server 120 for fare information, and executes the application 220 to select (e.g. from the source data 116) ancillary services. The request to the auxiliary server 120 can include both the virtual requester identifier 500-1 and any suitable portion of the requester attribute set mentioned earlier. That is, although the virtual requester identifiers determine which response definition is executed to generate response data, individual components of the server 104 may make use of requester-specific information to further refine the generation of response data.

Returning to FIG. 3, at block 340, responsive to generation of the response data, the server 104 transmits the response data for delivery to the requester 108. In the present example, turning to FIG. 7, the server 104 transmits a response 700 to the aggregator 112, for subsequent delivery to the requester 108-2. The response 700 may, for example, be transmitted to the aggregator as an NDC-formatted message, and the aggregator 112 may translate the response 700 to any suitable format before providing the response to the requester 108-2.

As will now be apparent, the system 100 (and particularly the server 104) enables the generation of responses to data requests without requiring response definitions to be configured for each requester 108. Instead, response definitions need only be configured for each virtual requester identifier 500. A given virtual requester identifier permits any number of requesters to be mapped to a single response definition, thus potentially greatly reducing the volume of response generation configuration required at the server 104. Such clustering of requesters 108 under a smaller number of virtual requester identifiers enables the operator of the server 104 to balance granularity of response generation against storage and computational load. Further, the use of requester attributes as well as the virtual requester identifier in response generation enables response generation to be tailored to specific requesters 108 where desired.

As will also be apparent from the above discussion, the system 100 enables the modification of differential response generation, e.g. by deploying additional virtual requester identifiers and corresponding response definitions, while mitigating or eliminating the need to reconfigure existing response definitions. For example, an airline is enabled to implement an additional response definition, along with a corresponding virtual requester identifier, and need only update the selection criteria 132 to redirect desired requests to the new virtual requester identifier. Previous response definitions need not be altered.

Those skilled in the art will appreciate that in some embodiments, the functionality of any of the applications 212, 216 and 220, and/or of the auxiliary server 120, may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of differential responses to search requests in a request handling server, the method comprising:
- storing, in a memory of the request handling server:
  - (i) a predefined set of response definitions, each response definition for generation of responses search requests associated with a corresponding one of a plurality of virtual requester identifiers; and
  - (ii) a plurality of selection criteria for association of search requests with virtual requester identifiers prior to generation of response data;
- receiving a search request sent from one of a plurality of requesters external to the request handling server, the search request including (i) request parameters defining desired response data characteristics, and (ii) a requester attribute set defining at least one of (a) an identifier of the requester, (b) a requester type, (c) a geographic region of the requester;
- comparing the requester attribute set with the selection criteria;
- based on the comparison, assigning a selected one of the virtual requester identifiers to the search request;
- retrieving an active one of the response definitions corresponding to the selected virtual requester identifier;
- obtaining response data according to the request parameters and the active response definition; and
- transmitting, in response to the search request, the response data.

2. The method of claim 1, wherein the set of response definitions includes a default response definition corresponding to a default one of the virtual requester identifiers; and
- wherein assigning the selected virtual requester identifier includes, when the requester attribute set does not satisfy any of the selection criteria, assigning the default virtual requester identifier to the request.

3. The method of claim 1, further comprising storing, in the memory, a source data repository;
- wherein obtaining the response data comprises generating the response data from the source data according to the response definition and the request parameters.

4. The method of claim 1, wherein obtaining the response data comprises:
- sending a query from the response handling server to an auxiliary server identified within the response definition, the query including the virtual requester identifier and the request parameters; and
- receiving the response data from the auxiliary server in response to the query.

5. The method of claim 4, wherein the query further includes the requester attribute set.

6. The method of claim 1, wherein receiving the search request comprises receiving the search request directly from the one of the plurality of requesters.

7. The method of claim 1, wherein receiving the search request comprises receiving the search request from an aggregator associated with a subset of the plurality of requesters.

8. The method of claim 7, further comprising, prior to receiving the search request: establishing a communications link with the aggregator using a single set of aggregator credentials.

9. The method of claim 1, wherein the request parameters define a request for a travel product offer, and wherein the response data defines at least one offered travel product.

10. The method of claim 1, wherein the requester attribute set includes the requester type, and wherein each selection criterion includes at least a virtual requester type.

11. The method of claim 1, wherein the search request is a request for travel product offers formatted according to the New Distribution Capability (NDC) standard.

12. A request handling server comprising:

a memory storing: (i) a predefined set of response definitions, each response definition for generation of responses search requests associated with a corresponding one of a plurality of virtual requester identifiers, and (ii) a plurality of selection criteria for association of search requests with virtual requester identifiers prior to generation of response data;

a communications interface; and a processor connected with the memory and the communications interface, the processor configured to:

receive a search request from one of a plurality of requesters via the communications interface, the search request including (i) request parameters defining desired response data characteristics, and (ii) a requester attribute set defining at least one of (a) an identifier of the requester, (b) a requester type, (c) a geographic region of the requester;

compare the requester attribute set with the selection criteria;

based on the comparison, assign a selected one of the virtual requester identifiers to the search request;

retrieve an active one of the response definitions corresponding to the selected virtual requester identifier;

obtain response data according to the request parameters and the active response definition; and transmit, in response to the search request, the response data via the communications interface.

13. The request handling server of claim 12, wherein the set of response definitions includes a default response definition corresponding to a default one of the virtual requester identifiers; and wherein the processor is configured, in order to assign the selected virtual requester identifier, to assign the default virtual requester identifier to the request when the requester attribute set does not satisfy any of the selection criteria.

14. The request handling server of claim 12, wherein the memory further stores a source data repository; and wherein the processor is configured, in order to obtain the response data, to generate the response data from the source data according to the response definition and the request parameters.

15. The request handling server of claim 12, wherein the processor is configured, in order to obtain the response data, to:

send a query from the response handling server to an auxiliary server identified within the response definition, the query including the virtual requester identifier and the requester parameters; and receive the response data from the auxiliary server in response to the query.

16. The request handling server of claim 15, wherein the query further includes the requester attribute set.

17. The request handling server of claim 12, wherein the processor is configured to receive the search request directly from the one of the plurality of requesters.

18. The request handling server of claim 12, wherein the processor is configured to receive the search request from an aggregator associated with a subset of the plurality of requesters.

19. The request handling server of claim 18, wherein the processor is further configured, prior to receipt of the search request, to establish a communications link with the aggregator using a single set of aggregator credentials.

20. The request handling server of claim 12, wherein the request parameters define a request for a travel product offer, and wherein the response data defines at least one offered travel product.

21. The request handling server of claim 12, wherein the requester attribute set includes the requester type, and wherein each selection criterion includes at least a virtual requester type.

22. The request handling server of claim 12, wherein the search request is a request for travel product offers formatted according to the New Distribution Capability (NDC) standard.

* * * * *